United States Patent
Dennison et al.

(10) Patent No.: US 11,345,097 B2
(45) Date of Patent: May 31, 2022

(54) METHOD OF MAKING A FRANGIBLE SEAL IN A SAMPLE PROCESSING DEVICE

(71) Applicant: Roche Molecular Systems, Inc., Pleasanton, CA (US)

(72) Inventors: Allen C. Dennison, Whitinsville, MA (US); Jervis P. Lynch, Doylestown, PA (US); Colby C. Spencer, West Boylston, MA (US)

(73) Assignee: Roche Molecular Systems, Inc., Pleasanton, CA (US)

( * ) Notice: Subject to any disclaimer, the term of this patent is extended or adjusted under 35 U.S.C. 154(b) by 0 days.

(21) Appl. No.: 16/954,353

(22) PCT Filed: Dec. 19, 2018

(86) PCT No.: PCT/EP2018/085739
§ 371 (c)(1),
(2) Date: Jun. 16, 2020

(87) PCT Pub. No.: WO2019/121850
PCT Pub. Date: Jun. 27, 2019

(65) Prior Publication Data
US 2021/0086455 A1 Mar. 25, 2021

Related U.S. Application Data

(60) Provisional application No. 62/607,522, filed on Dec. 19, 2017.

(51) Int. Cl.
*B29C 65/00* (2006.01)
*B29C 65/18* (2006.01)
*B29L 31/00* (2006.01)

(52) U.S. Cl.
CPC ........ *B29C 66/83221* (2013.01); *B29C 65/18* (2013.01); *B29C 66/4312* (2013.01);
(Continued)

(58) Field of Classification Search
CPC . B29C 65/18; B29C 66/0242; B29C 66/4312; B29C 66/43121; B29C 66/71;
(Continued)

(56) References Cited

U.S. PATENT DOCUMENTS 4,622,798 A * 11/1986 Oki ..................... B29C 66/8221
156/583.1
7,718,421 B2 * 5/2010 Chen .................. C12N 15/1003
435/288.5

(Continued)

FOREIGN PATENT DOCUMENTS

JP       10101027 A     4/1998

OTHER PUBLICATIONS

"Low-Density Polyethylene (LDPE)" from polymerdatabase.com as captured by archive.org Mar. 29, 2016.*
(Continued)

*Primary Examiner* — John L Goff, II
(74) *Attorney, Agent, or Firm* — Pamela C. Ancona

(57) ABSTRACT

A sealing device configured to create a frangible seal in a sample processing device is described. Methods of using the device to create one or more frangible seals in a sample processing device are also described.

9 Claims, 4 Drawing Sheets

(52) U.S. Cl.
CPC ........ *B29C 66/71* (2013.01); *B29C 66/73921* (2013.01); *B29C 66/91421* (2013.01); *B29C 66/91431* (2013.01); *B29C 66/91935* (2013.01); *B29C 66/9241* (2013.01); *B29C 66/9292* (2013.01); *B29C 66/949* (2013.01); *B29L 2031/712* (2013.01)

(58) Field of Classification Search
CPC .......... B29C 66/73921; B29C 66/8221; B29C 66/8225; B29C 66/83221; B29C 66/849; B29C 66/8491; B29C 66/851; B29C 66/8511; B29C 66/91431; B29C 66/91421; B29C 66/91935; B29C 66/92; B29C 66/9241; B29C 66/9292; B29C 66/949; B29C 66/9261; B29C 66/92611; B01L 3/502; B65B 51/30; B65B 51/303; B29L 2031/712; B29L 2031/753

USPC .................................................. 156/583.91
See application file for complete search history.

(56) References Cited

U.S. PATENT DOCUMENTS

| | | | |
|---|---|---|---|
| 2001/0008064 A1* | 7/2001 | Todd | B29C 66/8181 53/455 |
| 2008/0209864 A1* | 9/2008 | Fergusson | B65B 51/303 53/451 |

OTHER PUBLICATIONS

"Polypropylene (PP)" from polymerdatabase.com as captured by archive.org Mar. 29, 2016.*
International Search Report; PCT/EP2018/085739; dated Apr. 4, 2019.

* cited by examiner

METHOD OF MAKING A FRANGIBLE SEAL IN A SAMPLE PROCESSING DEVICE

CROSS-REFERENCES TO RELATED APPLICATIONS

This is a continuation of International Patent Application No. PCT/EP2018/085739, filed Dec. 19, 2018, which claims the benefit and priority of U.S. Provisional Application Ser. No. 62/607,522, filed Dec. 19, 2017, both of which applications are incorporated herein by reference.

BACKGROUND

The analysis of nucleic acids in clinical or environmental samples generally involves a series of chemical, optical, electrical, mechanical, and thermal processing steps on the fluid samples. In recent years, there has been growing interest in developing disposable cartridges for conducting analyses of biological samples for various diagnostic and monitoring purposes. For example, U.S. Pat. No. 5,587,128 to Wilding discloses devices for amplifying a preselected polynucleotide in a sample by conducting a polynucleotide amplification reaction. U.S. Pat. No. 5,922,591 to Anderson et al. describes a miniaturized, integrated nucleic acid diagnostic device and system. The device is generally capable of performing one or more sample acquisition and preparation operations, in combination with one or more sample analysis operations.

Due to the complex series of operations that must be performed using fully integrated, self-contained devices, manufacturers have produced such devices with all of the reagents necessary to perform each operation required for an assay pre-loaded in the device. As a result, the menu of available assays is quite limited and there is a need to enable a user to incorporate user-provided reagents, e.g., primers and probes, so that the available menu of assays can be expanded to meet the wide range of customer needs.

SUMMARY

The disclosure provides a sealing press comprising a pair of isothermally heated dies, the pair including a forward and a reverse die each comprising a sealing surface opposed to each other and adapted to hold there between a sample processing device positioned along a sealing plane, wherein the forward and reverse die are each independently positioned on and controlled by a forward and reverse alignment slider, respectively, the forward and reverse alignment sliders are connected to an actuator which provides thrust for synchronized movement of the forward and reverse die. In some embodiments, each of the forward and reverse alignment sliders are mounted to a forward and reverse caliper arm, respectively, and the forward and reverse caliper arms are each mounted to a mechanical linkage connected to the actuator. In certain embodiments, the mechanical linkage comprises a lever, a first con rod and a second con rod, wherein the lever comprises a central pivot point and a first and second end, wherein the first con rod is pivotally connected to the first end of the lever and pivotally connected to one end of the reverse caliper arm, wherein the second con rod is pivotally connected to the second end of the lever and pivotally connected to one end of the forward caliper arm, wherein the first and second caliper arms are connected to the forward and reverse alignment sliders, respectively. In other embodiments, the sealing press further comprises an independent forward die control mechanism, the mechanism is connected to the forward die and comprises a forward die driver connected to a supplemental forward die linear slider and an independent forward die controller, wherein the mechanism independently actuates the forward die from the forward caliper arm, thereby adjusting the contact pressure between the sealing surfaces. In some embodiments, the pair of isothermally heated dies are configured to be heated to a constant temperature below a melt temperature of a substrate of the sample processing device. In certain embodiments, the substrate comprises polypropylene and the dies are heated to about 105-115° C.

Also provided is a method of creating a frangible seal in a sample processing device comprising a tubing substrate, the method comprising: (i) maintaining sealing dies of a sealing press at a constant temperature, e.g., between about 15-25° C. below the melt temperature of the tubing substrate; (ii) positioning the tubing substrate along the sealing plane of the sealing press; (iii) pressing each of the sealing surfaces of the pair of dies into the tubing substrate at pressures less than or equal to the compressive yield strength of the tubing substrate for a time sufficient to transmit heat through the outer membrane of the tubing substrate to the inner bonding surfaces of the substrate; and (iv) withdrawing the heated dies and holding the part tensionless to allow the partially molten seal created by step (iii) to cool and shrink. In some embodiments, a method of creating a frangible seal in a sample processing device is provided, said sample processing device comprising a hollow tubing substrate having an outer surface and an inner surface, wherein the method is performed by a sealing press comprising a pair of isothermally heated dies, the pair including a forward and a reverse die each comprising a sealing surface opposed to each other and adapted to hold there between a sample processing device positioned along a sealing plane, wherein the forward and reverse die are each independently positioned on and controlled by a forward and reverse alignment slider, respectively, the forward and reverse alignment sliders are connected to an actuator which provides thrust for synchronized movement of the forward and reverse dies, the method comprising: (a) maintaining the pair of isothermally heated dies at a constant temperature below a melt temperature of a substrate of the sample processing device; (b) positioning the substrate along the sealing plane of the sealing press; (c) pressing the sealing surfaces of the forward and reverse die into the substrate of the sample processing device at a pressure of approximately 50-100% of a compressive yield strength of the substrate for a time sufficient to transmit heat through an outer surface of the substrate to the inner surfaces of the substrate, thereby forming a partially molten seal; and (d) withdrawing the forward and reverse dies and holding the forward and reverse dies tensionless to allow the partially molten seal to cool and shrink. In some embodiments, a sealing device of the current disclosure is used for creating a frangible seal in the sample processing device. In some embodiments, the pair of isothermally heated dies are maintained at a constant temperature approximately 15-25° C. below the melt temperature of the tubing substrate. In some embodiments, the substrate comprises polypropylene and the pair of isothermally heated dies are maintained at a constant temperature of approximately 105-115° C. In some embodiments, the sealing surfaces of the forward and reverse dies are pressed into the substrate at a pressure of approximately 300-600 psi. In some embodiments, the forward and reverse die are pressed against the substrate for about 3-6 seconds.

DETAILED DESCRIPTION

Figure 1B:
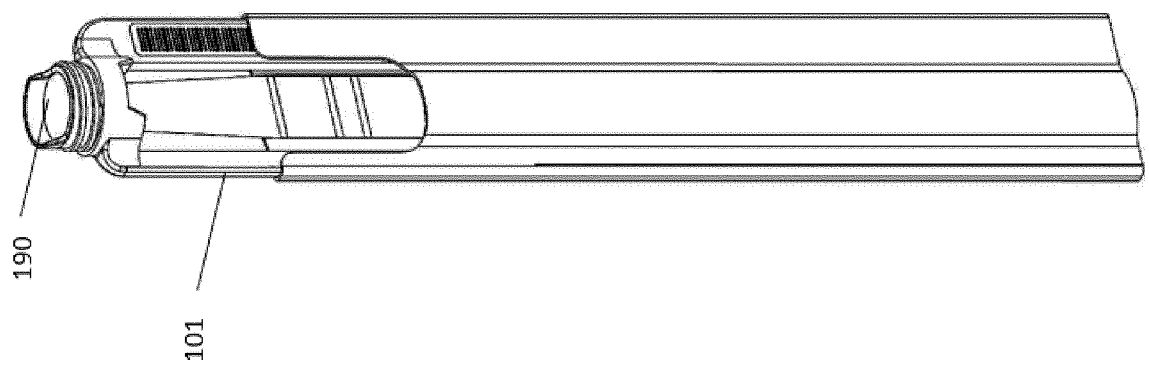
FIG. 1B is a perspective view of an exemplary embodiment of a sample tube.

Unless otherwise defined herein, scientific and technical terms used in connection with the present disclosure shall have the meanings that are commonly understood by those of ordinary skill in the art. Further, unless otherwise required by context, singular terms shall include pluralities and plural terms shall include the singular. The articles "a" and "an" are used herein to refer to one or to more than one (i.e., to at least one) of the grammatical object of the article. By way of example, "an element" means one element or more than one element.

The methods described herein are used to manufacture a sample processing device configured to perform a nucleic acid amplification technique. Nucleic acids extracted from the biological samples may be further processed by amplifying the nucleic acids using at least one of the following exemplary methods: polymerase chain reaction (PCR), rolling circle amplification (RCA), ligase chain reaction (LCR), transcription mediated amplification (TMA), nucleic acid sequence based amplification (NASBA), and strand displacement amplification reaction (SDAR). In some embodiments, the nucleic acids extracted from the organism can be ribonucleic acids (RNA) and their processing may include a coupled reverse transcription and polymerase chain reaction (RT-PCR) using combinations of enzymes such as Tth polymerase and Taq polymerase or reverse transcriptase and Taq polymerase. In some embodiments, nicked circular nucleic acid probes can be circularized using T4 DNA ligase or Ampligase™ and guide nucleic acids, such as DNA or RNA targets, followed by detecting the formation of the closed circularized probes after an in vitro selection process. Such detection can be through PCR, TMA, RCA, LCR, NASBA or SDAR using enzymes known to those familiar with the art.

In exemplary embodiments, the amplification of the nucleic acids can be detected in real time by using fluorescent-labeled nucleic acid probes or DNA intercalating dyes as well as a photometer or charge-coupled device in the molecular analyzer to detect the increase in fluorescence during the nucleic acid amplification. These fluorescently-labeled probes use detection schemes well known to those familiar in the art (i.e., TaqMan™, molecular Beacons™, fluorescence resonance energy transfer (FRET) probes, Scorpion™ probes) and generally use fluorescence quenching as well as the release of quenching or fluorescence energy transfer from one reporter to another to detect the synthesis or presence of specific Nucleic acids.

In one embodiment, the methods disclosed herein are used to manufacture a device comprising self-contained microscale to macroscale channels, chambers, reservoirs, detection and processing regions. The device can be a cartridge, device, container, or pouch, e.g., as described in U.S. Pat. Nos. 6,440,725; 6,783,934; 6,818,185; 6,979,424; 8,580,559; and 8,940,526, as well as devices such as those available from Cepheid Corp., Idaho Technology, Inc., and/or Biofire Diagnostics, Inc.

In a specific embodiment, the methods described herein are used to form a seal in a sample processing device such as that described in U.S. Pat. No. 7,718,421. Segmented devices, such as those described in U.S. Pat. No. 7,718,421, provide a convenient vessel for receiving, storing, processing, and/or analyzing a biological sample. In certain embodiments, the segmented tube facilitates sample processing protocols involving multiple processing steps. In certain embodiments, a reagent is introduced into a segment of the tube, sample is collected in the tube, and the tube is then positioned in an analyzer which can manipulate the tube and its contents to process the sample.

Figure 1A:
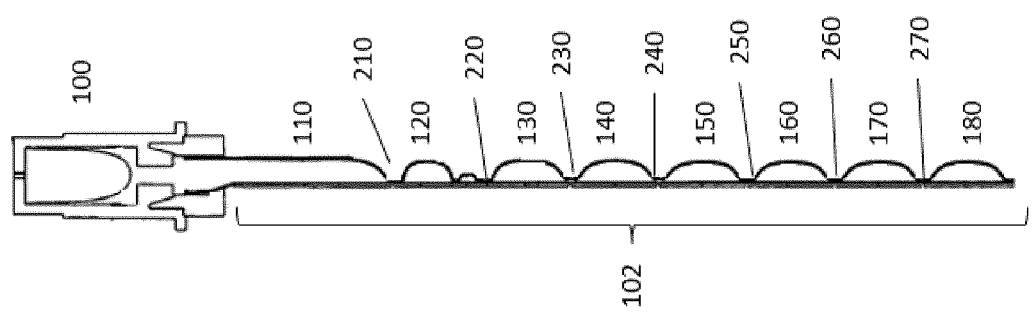
FIG. 1A is a cross sectional view of a sample tube positioned inside an analyzer.

One embodiment of a sample processing device is shown in FIGS. 1A-1B. The sample processing device 100 includes a frame 101 and a substrate 102 including an arrangement of 2 or more segments 110, 120, 130, 140, 150, 160, 170, and/or 180. Each of the segments are separated by a breakable or frangible seal, e.g., 210, 220, 230, 240, 250, 260, and/or 270. In the embodiment depicted in FIGS. 1A-1B, the arrangement of segments is linear and the substrate is provided in the form of a tube having a hollow center, an outer surface, and inner surface which faces the hollow center of the tube. However, alternative arrangements are also envisioned and the methods and devices described herein can be used to create a sample processing device having a substrate that is partitioned in a non-linear arrangement.

In a specific embodiment, the linear arrangement depicted in FIGS. 1A-1B facilitates movement of the sample and resultant waste and target through the tube in a controlled manner. For example, a biological sample can be input through a first opening 190 in a first segment 110 of the tube. Thereafter, waste from a processed sample can be moved back toward the first opening while the target is pushed towards the opposite end, thereby minimizing contamination of the target by reaction inhibitors that may have become attached to the tube wall, and confining the target to a clean segment of the tube which can contain suitable reagents for further operations of the target. Some embodiments may use a plurality of at least three segments, each containing at least one reagent. In some embodiments, these segments may contain reagents in the following order: the reagent in the second segment may be either a lysis reagent, a dilution or wash buffer, or a substrate; the reagent in the third segment may be either a substrate, a lysis reagent, a washing buffer or a neutralization reagent; the reagent in the fourth segment may be a wash buffer, a suspension buffer, an elution reagent, or nucleic acid amplification and detection reagents. In some embodiments, the three segments may be arranged continuously, while in other embodiments, these three segments may be separated by another segment or segments in between.

In a particular embodiment, one or more frangible or breakable seals, e.g., 210, can be incorporated in a substrate of the sample processing device to selectively close and open a chamber in the substrate of the sample processing device to allow reagents stored in a first chamber, e.g., 110, to be introduced to an adjacent chamber in the tube, e.g., 120. In some embodiments, a combination of a breakable seal and a pressure gate may be provided for transferring the contents of the reagent introduction port to the adjacent segment.

A frangible seal is one that is easily broken, torn, or cut, including but not limited to, a blister pack or a foil seal. In one embodiment, the frangible seal is resealable or self-sealing. A frangible seal is incorporated into the substrate of the sample processing device to prevent mixing of the reagents positioned within a given segment during storage, but which can be burst or peeled to allow mixing between segment during assay processing upon selective application of a suitable pressure to the outer surface of one or more segments of the device without breaking the outer surface of the substrate.

Figure 2:
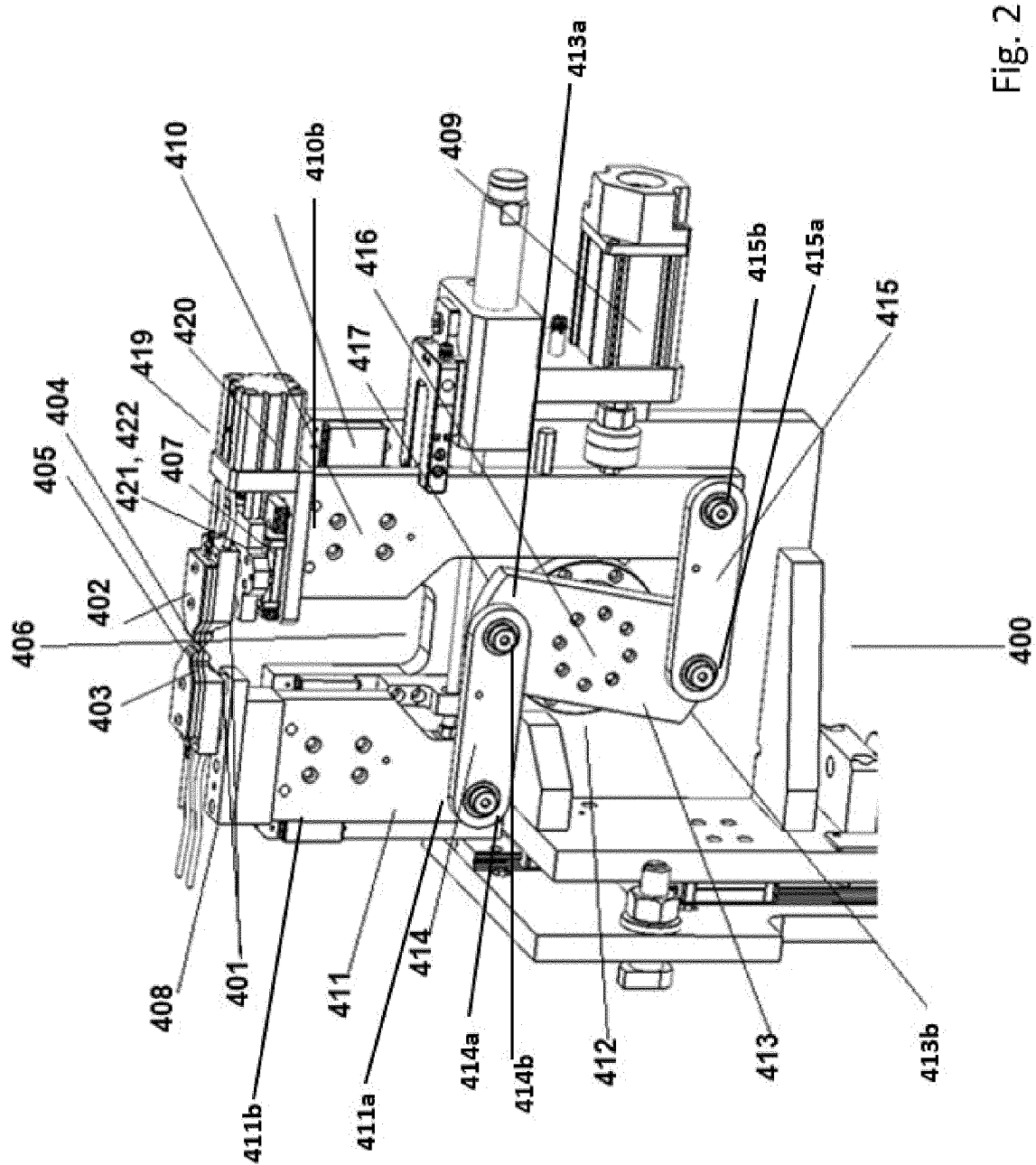
FIG. 2A is a cross sectional view of a sealing press in a closed position.
Figure 3A:
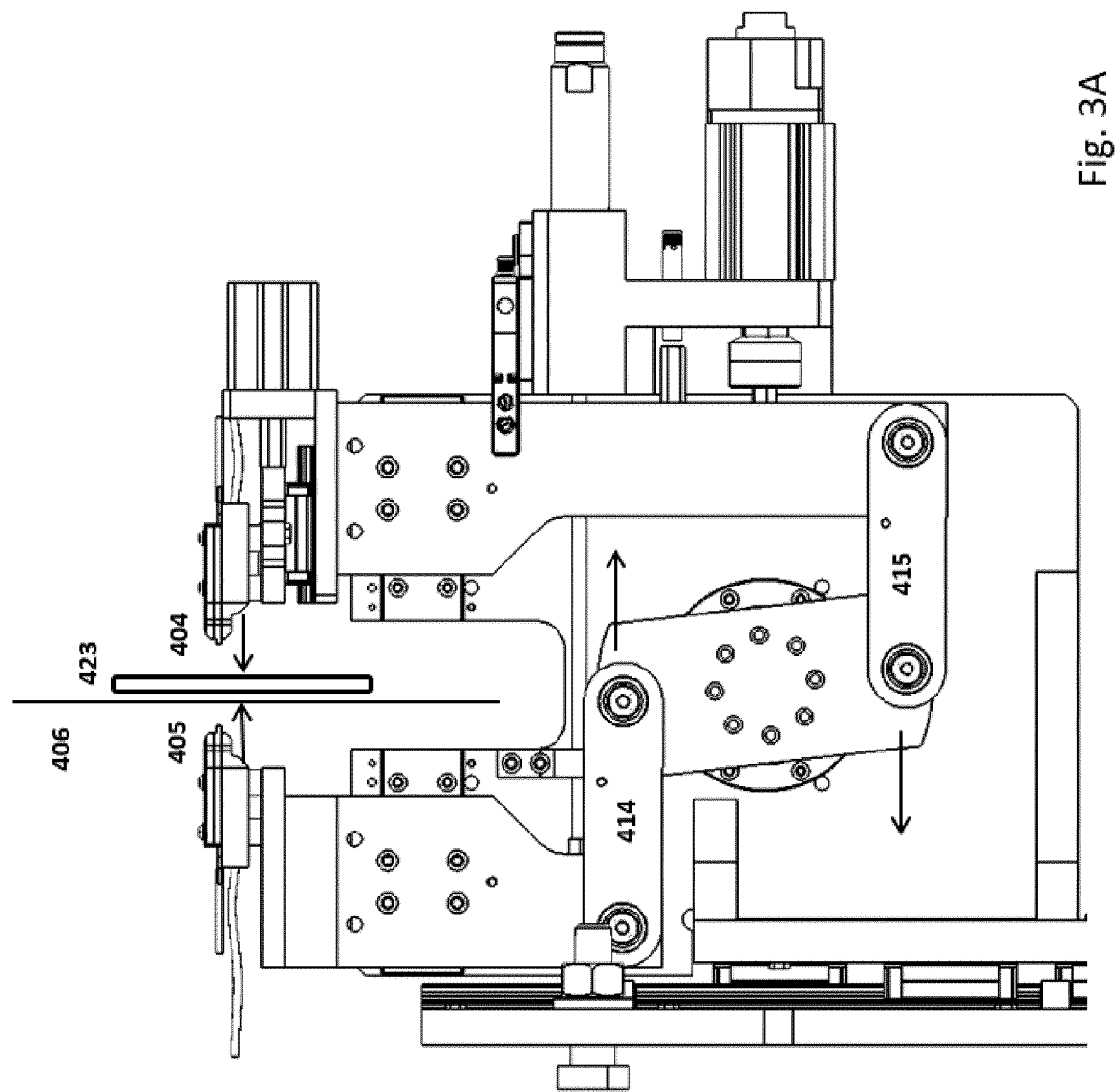
FIG. 3A is a cross sectional view of the sealing press in an open position prior to insertion of a sample processing device therein.
Figure 3B:
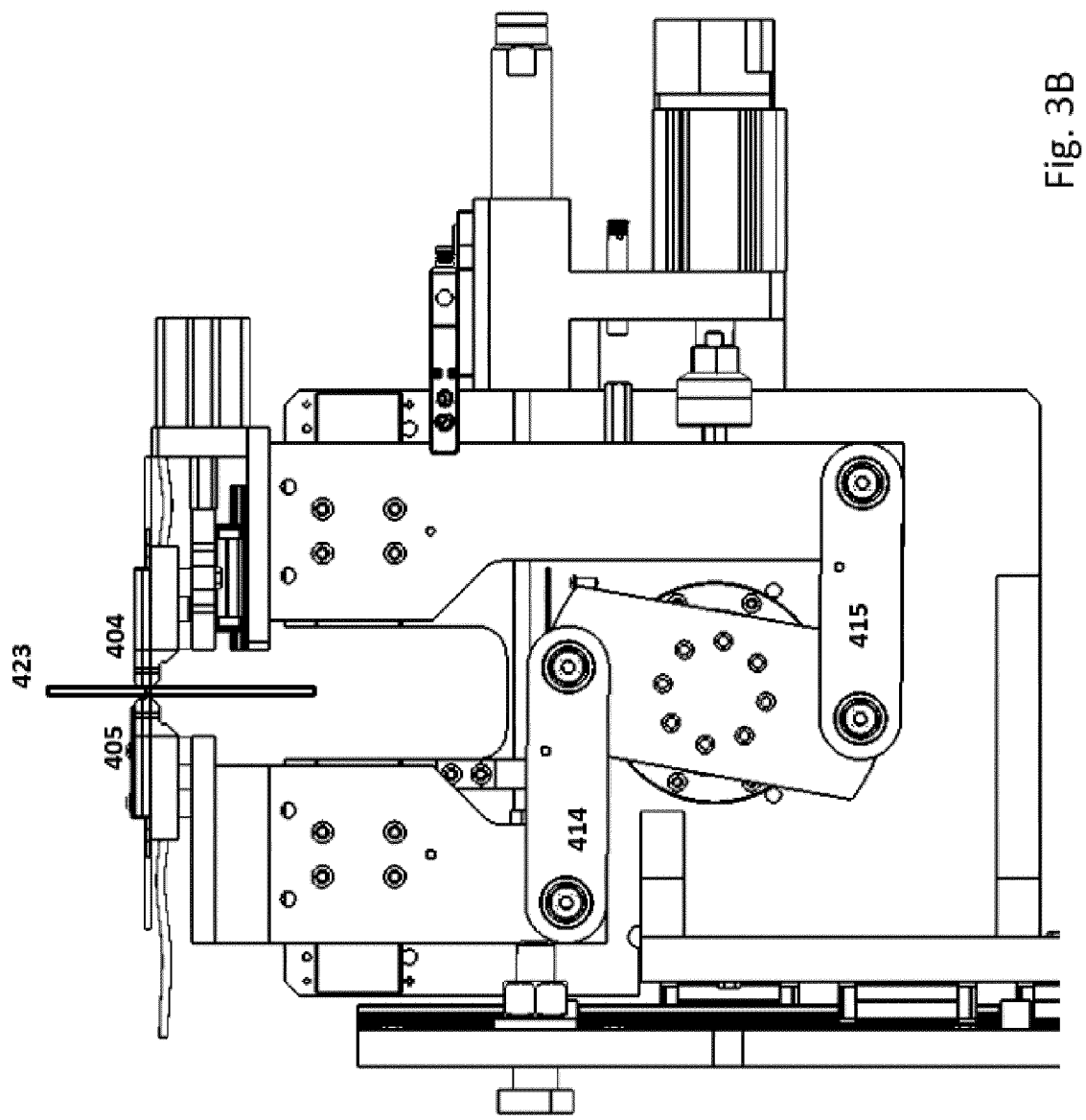
FIG. 3B is cross sectional view of the sealing press in a closed position upon insertion of a sample processing device therein.

A device to create a frangible seal in a sample processing device is illustrated in FIGS. 2, 3A, and 3B. The device includes a sealing press 400 comprising a pair of isothermally heated dies 401, the pair including a forward 402 and a reverse die 403, wherein each die comprises a sealing surface (404, 405, respectively) opposed to each other and adapted to hold there between a sample processing device positioned along a sealing plane 406. In a specific embodiment, the forward and reverse dies are each independently positioned on and controlled by a forward 407 and reverse alignment slider 408, respectively, and the forward and reverse alignment sliders are connected to an actuator 409 which provides thrust for synchronized movement of the forward and reverse dies.

In one embodiment, each of the forward and reverse alignment sliders are mounted to a forward 410 and reverse caliper arm 411, respectively, and the forward and reverse caliper arms are each mounted to a mechanical linkage 412 connected to the actuator 409. In this embodiment, the mechanical linkage comprises a lever 413 to which first and second con rods (414, 415, respectively) are attached. The lever 413 comprises a central pivot point 416 and a top and bottom end (413a, 413b, respectively). The first con rod 414 comprises a proximate and a distal end (414a, 414b, respectively), and the first con rod 414 is pivotally connected at the distal end 414b to the top end 413a of the lever 413 and pivotally connected to the bottom end 411a of the reverse caliper arm 411. Likewise, the second con rod 415 comprises a proximate and a distal end (415a, 415b, respectively) and the second con rod 415 is pivotally connected at the proximate end 415a to the bottom end of the lever 413b and pivotally connected at the distal end 415b to the bottom end 410a of the forward caliper arm 410. Moreover, the upper portions (410b, 411b) of the first and second caliper arms (410, 411) are connected to the forward and reverse alignment sliders (407, 408), respectively.

In addition, the sealing press also includes an independent forward die control mechanism 419 which is connected to the forward die and comprises a forward die driver 420 connected to a supplemental forward die linear slider 421 and an independent forward die controller 422. The forward die control mechanism independently actuates the forward die from the forward caliper arm, thereby adjusting the contact pressure between the sealing surfaces of the dies.

In practice, a frangible seal is created in a sample processing device by heating the sealing dies to a constant temperature below the melt temperature of the substrate of the sample processing device. If the substrate comprises a plastic substance, e.g., polypropylene, with a melt temperature of about 125-135° C., the sealing dies are heated to a constant temperature of about 15-25° C. below the melt temperature, i.e., 105-115° C. Once the dies reach the desired temperature, the dies are maintained at that temperature during operation. The substrate of the sample processing device (e.g., 423 in FIGS. 3A-3B) is then positioned along the sealing plane 406 of the sealing press, between the forward and reverse dies (404, 405). Each of the forward and reverse dies are moved toward the sealing plane, the reverse die is moved toward the sealing plane toward the actuator 409 and the forward die moved toward the sealing plane away from the actuator 409. The sealing surfaces of the pair of dies are pressed against the outer surface of the substrate at pressures at or below the compressive yield strength of the substrate. For example, the pressure is approximately 50-100% of the compressive yield strength of the substrate. If the substrate is plastic, e.g., polypropylene, the compressive yield strength is about 300-600 psi, and therefore, the pressure is approximately 150-600 psi. The sealing surfaces of the pair of dies are pressed against the outer surface (e.g., as shown in FIG. 3B) for a sufficient time to transmit heat through the outer surfaces to the inner surfaces of the substrate, e.g., 3-6 seconds, thereby forming a partially molten seal between the inner surfaces of the substrate. The heated dies are withdrawn from the outer surfaces of the substrate and the pair of dies are held apart from the substrate, tensionless, to allow the partially molten seal in the substrate to cool and shrink, thereby forming the frangible seal.

The process can be repeated to create one or more additional frangible seals in the substrate of the sample processing device. For example, the process can be initiated by placing a volume of a reagent at the base of the hollow substrate in the sample processing device, and then the sample processing device is positioned in the device described herein and illustrated in FIGS. 2 and 3A-3B and a frangible seal is created above the volume of reagent in the base on the substrate, thereby forming a chamber in the substrate between the base and the first frangible seal. Subsequently, an additional volume of reagent (the same or a different reagent) is dispensed in the hollow tubing above the frangible seal and the process is repeated once more to create an additional frangible seal and an additional chamber in the substrate between the first frangible seal and the additional frangible seal.

The invention claimed is:

1. A sealing press comprising a pair of isothermally heated dies, the pair including a forward and a reverse die each comprising a sealing surface opposed to each other and adapted to hold therebetween a sample processing device positioned along a sealing plane, wherein the forward and reverse dies are each independently positioned on and controlled by a forward and reverse alignment slider, respectively, the forward and reverse alignment sliders are each mounted to a forward and reverse caliper arm, respectively, and the forward and reverse caliper arms are each mounted to a mechanical linkage connected to an actuator which provides thrust for synchronized movement of the forward and reverse dies, wherein the forward die is connected to an independent forward die control mechanism comprising a forward die driver connected to a supplemental forward die linear slider and an independent forward die controller, wherein the mechanism independently actuates the forward die from the forward caliper arm, thereby adjusting a contact pressure between the sealing surfaces.

2. The sealing press of claim 1, wherein the mechanical linkage comprises a lever, a first con rod and a second con rod, wherein the lever comprises a central pivot point and a first and second end, wherein the first con rod is pivotally connected to the first end of the lever and pivotally connected to one end of the reverse caliper arm, wherein the second con rod is pivotally connected to the second end of the lever and pivotally connected to one end of the forward caliper arm, wherein the forward and reverse caliper arms are connected to the forward and reverse alignment sliders, respectively.

3. The sealing press of claim 1, wherein the pair of isothermally heated dies are configured to be heated to a constant temperature below a melt temperature of a substrate of the sample processing device.

4. The sealing press of claim 3 wherein the substrate comprises polypropylene and the dies are heated to about 105-115° C.

5. A method of creating a frangible seal in a sample processing device comprising a hollow tubing substrate having an outer surface and an inner surface, wherein the method is performed by a sealing press comprising a pair of isothermally heated dies, the pair including a forward and a reverse die each comprising a sealing surface opposed to each other and adapted to hold there between a sample processing device positioned along a sealing plane, wherein the forward and reverse dies are each independently positioned on and controlled by a forward and reverse alignment slider, respectively, the forward and reverse alignment sliders are each mounted to a forward and reverse caliper arm, respectively, and the forward and reverse caliper arms are each mounted to a mechanical linkage connected to an actuator which provides thrust for synchronized movement of the forward and reverse dies, wherein the forward die is connected to an independent forward die control mechanism comprising a forward die driver connected to a supplemental forward die linear slider and an independent forward die controller, wherein the mechanism independently actuates the forward die from the forward caliper arm, thereby adjusting a contact pressure between the sealing surfaces, the method comprising:

(a) maintaining the pair of isothermally heated dies at a constant temperature below a melt temperature of the substrate of the sample processing device;
(b) positioning the substrate along the sealing plane of the sealing press;
(c) pressing the sealing surfaces of the forward and reverse die into the substrate of the sample processing device at a pressure of approximately 50-100% of a compressive yield strength of the substrate for a time sufficient to transmit heat through an outer surface of the substrate to the inner surfaces of the substrate, thereby forming a partially molten seal; and
(d) withdrawing the forward and reverse dies and holding the forward and reverse dies tensionless to allow the partially molten seal to cool and shrink.

6. The method of claim 5, wherein the pair of isothermally heated dies are maintained at a constant temperature approximately 15-25° C. below the melt temperature of the tubing substrate.

7. The method of claim 5, wherein the substrate comprises polypropylene and the pair of isothermally heated dies are maintained at a constant temperature of approximately 105-115° C.

8. The method of claim 5, wherein the sealing surfaces of the forward and reverse dies are pressed into the substrate at a pressure of approximately 300-600 psi.

9. The method of claim 5, wherein the forward and reverse dies are pressed against the substrate for about 3-6 seconds.

* * * * *